Nov. 23, 1965    D. W. McAFEE, JR    3,218,723
TOOL FOR OBTAINING REGISTRY OF DRIVE SPINDLE
COUPLINGS WITH ROLLING MILL ROLLS
Filed April 4, 1963

INVENTOR.
DANIEL W. McAFEE, JR.
By Donald G. Dalton
Attorney

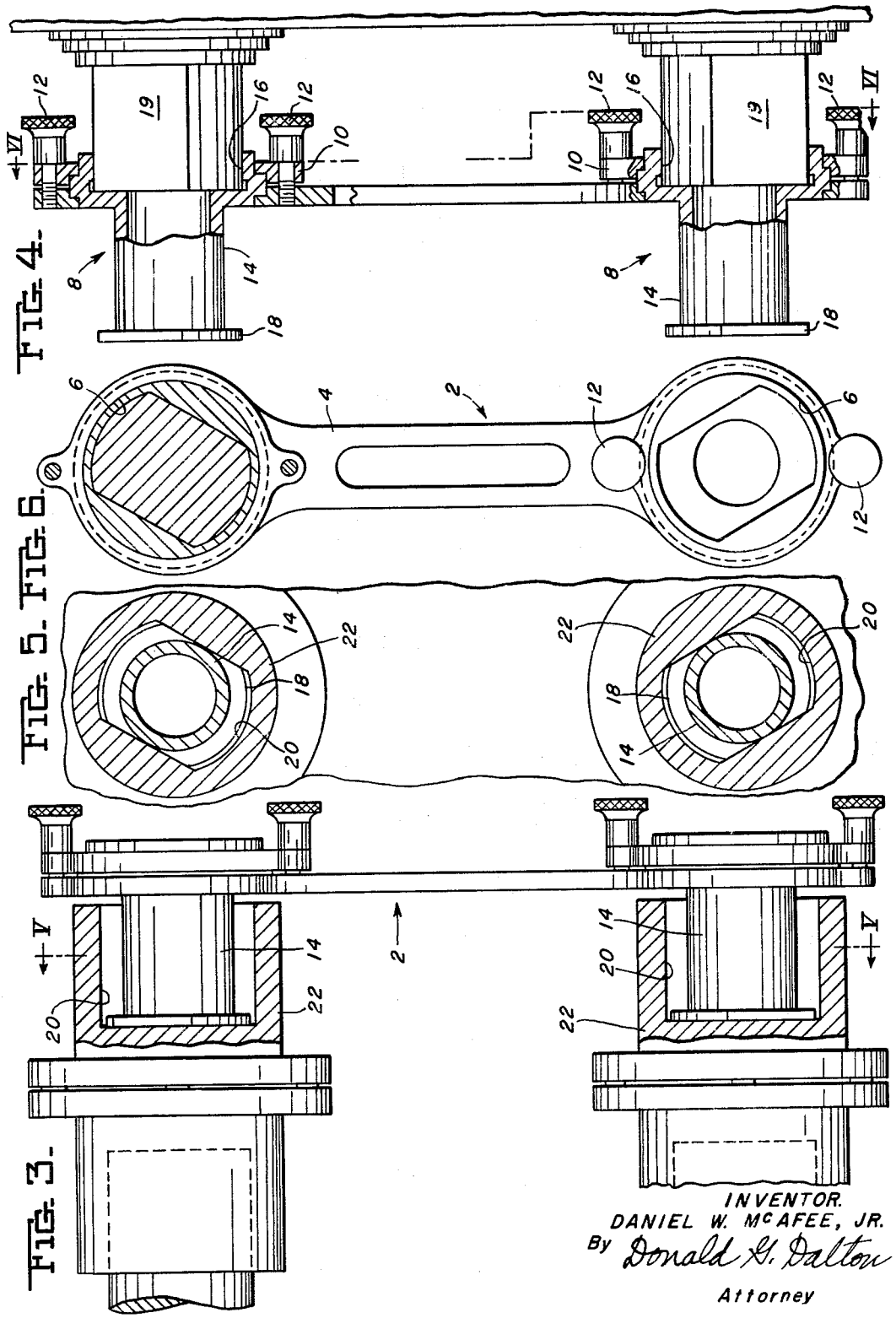

United States Patent Office 3,218,723
Patented Nov. 23, 1965

3,218,723
TOOL FOR OBTAINING REGISTRY OF DRIVE SPINDLE COUPLINGS WITH ROLLING MILL ROLLS
Daniel W. McAfee, Jr., Lorain, Ohio, assignor to United States Steel Corporation, a corporation of New Jersey
Filed Apr. 4, 1963, Ser. No. 270,663
1 Claim. (Cl. 33—182)

The present invention relates generally to rolling mills and, more particularly, to a tool for facilitating the connection of the rolls of a rolling-mill stand with their respective driving spindles.

Stretch-reducing mills commonly used for rolling pipe, bars, rods or billets are usually made up of a plurality of angularly-disposed roll stands each housing a pair of multi-grooved rolls. One example of this type of rolling mill is disclosed by U.S. Patent No. 3,043,170.

As best shown in FIGURE 8 of the aforementioned patent, the shafts of the pair of rolls in each housing project from the sides of the housing and are engaged at one end by spindle couplings attached to the ends of a pair of drive spindles or shafts. Whenever it is necessary to replace a roll stand of the mill, the roll shafts are disconnected from the spindle couplings and the roll stand, with the rolls contained therein, is removed from the mill line by sliding it away from the spindle couplings and driving mechanism which remain in the mill line. The replacement roll stand is then installed by sliding it into position adjacent the driving mechanism and inserting the ends of the roll shafts in the spindle couplings. The ends of the roll shafts which are engaged in the spindle couplings are substantially rectangular in cross section and are dimensioned to fit snugly in correspondingly-shaped recesses in the couplings. In order to effect a driving connection between the roll shafts of the replacement stand and the spindle couplings as the roll stand is slid toward the driving mechanism, the roll shafts must be in angular registry with the spindle couplings.

Prior to my invention, before the replacement roll stand was installed, a visual inspection of the relative angular positions of the spindle couplings was made, and the rolls of the roll stand were turned to position the roll shafts in angular registry with the recesses in the spindle couplings. Then the replacement stand was slid toward the driving mechanism with the expectation that the ends of the roll shafts would enter the recesses in the couplings. However, it was seldom that the roll shafts were positioned exactly in angular registry with the recesses of couplings when the first attempt to position the replacement roll stand was made so that it was necessary to determine how much more and in what direction the rolls had to be turned in order to achieve the necessary registry before the next installation attempt was made. Due to the limited space between adjacent roll stands and driving mechanisms of the mill line, such determinations were made by manually feeling the relative positions of the roll shaft ends and the recesses in the couplings as the ends of the roll shafts approached the couplings. Then the replacement roll stand was slid out of the mill line so that the rolls could again be turned in another attempt to place them in proper angular position. This procedure was repeated until the ends of the roll shafts were in angular registry with the spindle couplings so that an effective driving connection could be made. This operation was not only excessively time consuming but frequently caused a workman's hands to be injured as he attempted to determine the relative angular positions of the roll shaft ends and the spindle couplings as the roll stand was slid into position toward the driving mechanism.

It is, accordingly, the primary object of my invention to provide a tool whereby registry of the shafts of a pair of mill rolls journaled in a housing can be obtained with the couplings of spindles for driving the rolls while the roll housing is out of the mill line and disconnected from the spindle couplings.

This and other objects will become more apparent after referring to the following specification and attached drawings, in which:

FIGURE 3 is a side elevational view showing the tool in position in an initial stage of its use;

FIGURE 4 is a view similar to FIGURE 3 showing the tool in position in a subsequent stage of its use;

FIGURE 5 is a vertical sectional view taken along the line V—V of FIGURE 3; and

FIGURE 6 is a view taken along the line VI—VI of FIGURE 4.

Figure 1:
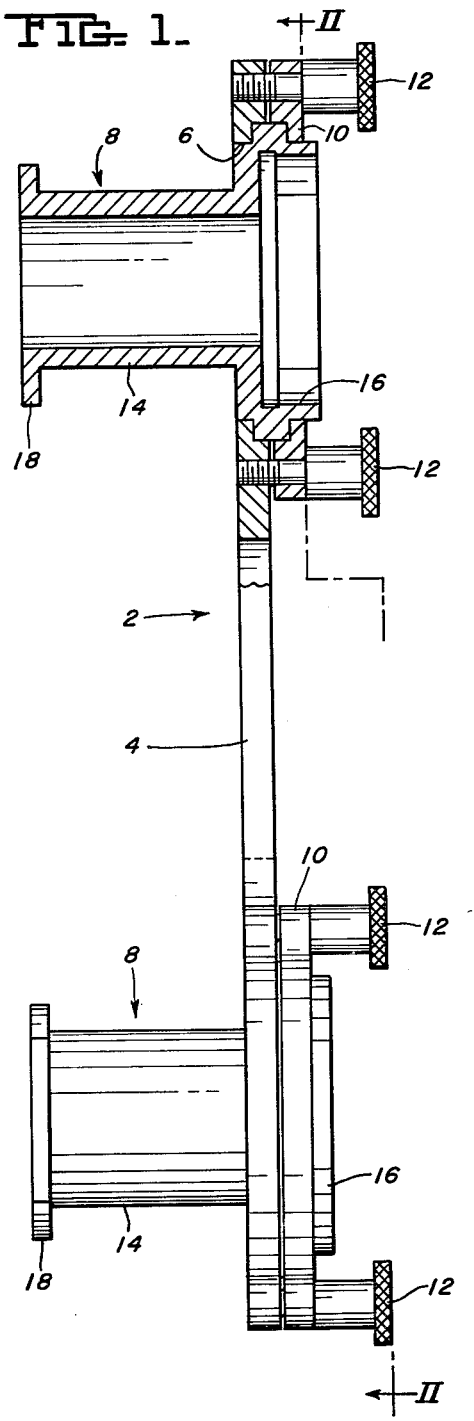
FIGURE 1 is a side elevational view partly in section of the tool of the invention.
Figure 2:
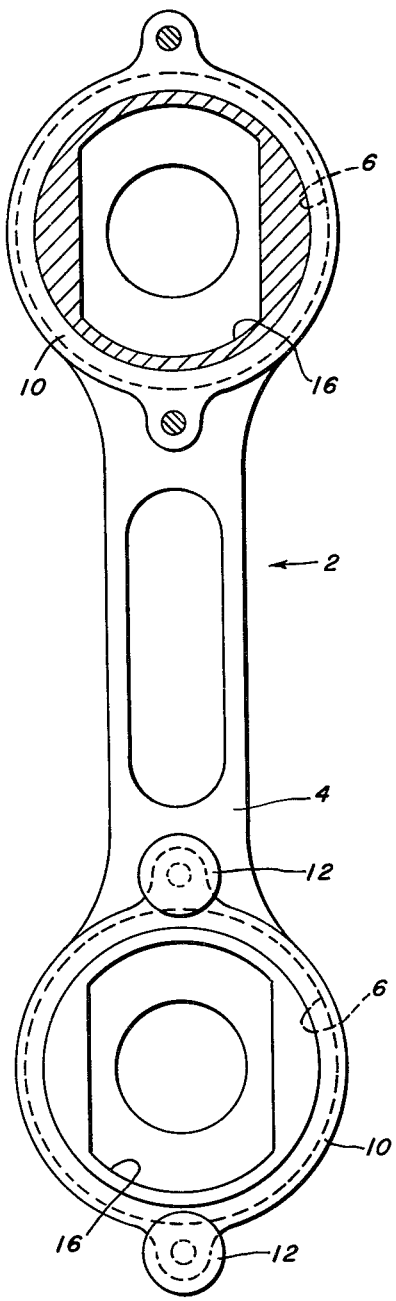
FIGURE 2 is a view taken along the line II—II of FIGURE 1.

Referring to the drawings, and more particularly for the present to FIGURES 1 and 2, reference numeral 2 designates generally the tool of the invention which consists of a flat bar 4 having circular holes 6 adjacent each end thereof, each of which accommodates a rotatable plug-and-socket fitting 8. A locking ring 10, adjustably secured to the bar 4 by a pair of thumb screws 12, serves to retain the plug-and-socket fittings 8 within their respective holes 6, as best shown in FIGURE 1. By proper adjustment of the screws 12, the plug-and-socket fittings can be loosely retained so they can be adjustably rotated in the openings 6 or tightly retained so that they will remain fixed in rotatably-adjusted position for purposes which will become apparent.

Each of the plug-and-socket fittings 8 includes a plug or male portion 14 on one end which projects from one side of the bar 4 and a socket or female portion 16 on its other end which projects from the opposite side of the bar. The end 18 of the plug 14 is provided with a perimetrical contour which is substantially the same as that of the roll shaft ends 19 and is dimensioned to fit easily into the recesses 20 of the spindle couplings 22 which connect the rolls to the driving mechanism (not shown) of the mill. The contours of the recesses 20 also correspond to the contours of the roll shaft ends 19. The socket portion of each fitting 8 is provided with an inner contour that corresponds to the contours of the roll shaft ends and are dimensioned to receive the roll shaft ends. The holes 6 are so formed in the bar 4 that their centers are spaced apart a distance equal to the common vertical center line distance between the spindle couplings 22 and the roll shaft ends 19.

In use of the tool, before a replacement stand is placed in the mill line, the thumb screws 12 are loosened so that the plug-and-socket fittings 8 can be adjustably rotated in the circular holes 6, and the tool is then set to the position of the spindle couplings 22 by inserting the plug portions 14 of the fittings into the corresponding spindle coupling recesses 20, as shown in FIGURE 3, and tightening screws 12 to secure the plug-and-socket fittings in fixed angular position corresponding to the relative angular positions of the spindle couplings. The tool is then removed from the couplings and taken over to the replacement stand where the socket portions 16 of the fittings are held against the corresponding roll shaft ends 19. Each roll shaft is then rotated to an angular position to suit the angular position of its corresponding socket 16, as best shown in FIGURE 4, thereby positioning the roll shaft ends in registry with the spindle couplings for proper aligned fit into the spindle couplings when the replacement stand is moved into operating position in the mill line.

After the roll shafts have been thus angularly positioned, the tool is removed from the roll shaft ends and the replacement stand is slid into operating position in the mill line toward the spindle couplings. As the roll stand approaches the spindle couplings, the angularly-adjusted roll shaft ends will be in registry with the coupling recesses 20 and will enter therein with no difficulty so that a driving connection between the roll driving mechanism and the roll shafts is readily accomplished.

While one embodiment of my invention has been shown and described, it will be apparent that other adaptations and modifications may be made without departing from the scope of the following claim.

I claim:

A tool for obtaining registry of the shafts of a pair of mill rolls journaled in a housing with the couplings of spindles for driving said rolls, while the rolls are disconnected from the couplings, which comprises a bar having plug-and-socket fittings rotatably mounted therein and spaced apart therealong the same distance as the distance between the axes of the rolls, the plug ends of said fittings extending outwardly of the same side of said bar and being adapted to be inserted in said couplings, said fittings having sockets in their other ends adapted to receive the end of said shafts the outer perimetrical contour of the plug end and the inner perimetrical contour of the socket end of each of said fittings being non-circular, substantially the same in size and shape, and disposed in the same angular position, and means for securing said fittings in rotatably adjusted position in said bar.

References Cited by the Examiner

UNITED STATES PATENTS

| | | | |
|---|---|---|---|
| 730,178 | 6/1903 | Vaughan | 33—182 |
| 963,895 | 7/1910 | Haughton | 81—60 |
| 966,130 | 8/1910 | Schneider | 81—60 |
| 1,319,834 | 10/1919 | Blake. | |
| 2,781,586 | 2/1957 | Eigenbrode | 33—181 |

ISAAC LISANN, *Primary Examiner.*